United States Patent Office 2,720,519
Patented Oct. 11, 1955

2,720,519

MONOAZO-DYESTUFFS

Ernst Reich, Basel, Switzerland, assignor to Ciba Limited, Basel, Switzerland, a Swiss firm No Drawing. Application September 2, 1952,
Serial No. 307,568

Claims priority, application Switzerland
September 14, 1951

3 Claims. (Cl. 260—201)

This invention provides valuable new monoazo-dyestuffs which are made by coupling a diazotized 6-nitro-4-acylamino-2-amino-1-hydroxybenzene with 2:8-dihydroxynaphthalene-6-sulfonic acid.

The acyl radical of the 6-nitro-4-acylamino-2-amino-1-hydroxybenzenes used as starting materials may be, for example, of aromatic or aliphatic character. Among others, there come into consideration the following acyl radicals: Benzoyl, meta- or para-nitrobenzoyl, para-chlorobenzoyl, phthaloyl, acetyl, propionyl and butyryl radicals, and also carbalkoxy radicals of the formula Alkyl—O—CO Very valuable dyestuffs are obtained from 6-nitro-4-acylamino-2-amino-1-hydroxybenzenes of the formula

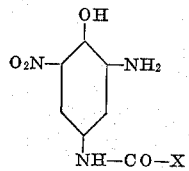

in which X represents a hydrocarbon radical containing at most 6 carbon atoms, especially a hydrocarbon radical of the composition—$C_nH_{2n+1}$ wherein $n$ represents a whole number of at most 3.

The diazotization of the 6-nitro-4-acylamino-2-amino-1-hydroxybenzenes can be carried out by the usual known methods, for example, by means of a mineral acid, especially hydrochloric acid, and sodium nitrite.

The coupling is advantageously carried out in a neutral to alkaline medium, and preferably in an alkaline medium. Thus, for example, there may be used a medium rendered alkaline with an alkali carbonate, an alkali hydroxide or an alkaline earth metal hydroxide.

Depending on the selection and quantity of the alkali used for the coupling reaction there are obtained dyestuffs which differ from one another in certain properties, but in all cases possess good properties of fastness. The differences can be explained by the fact that 2:8-dihydroxynaphthalene-6-sulfonic acid is capable of coupling in two positions, namely the 1- and 7-positions, and that coupling in one or other of these positions is favoured depending on the choice and quantity of the addition necessary for coupling.

The new monoazo-dyestuffs of the invention correspond to the general formula

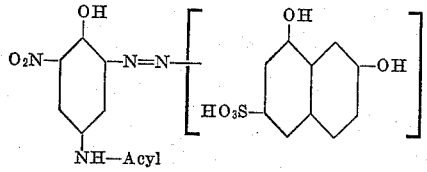

in which the azo group is linked in ortho position to a hydroxyl group.

The new dyestuffs can be used for dyeing or printing a very wide variety of materials, and, on account of their capacity for level dyeing, are very suitable, for example for dyeing loose wool. They can be treated with agents yielding metal, especially agents yielding chromium. The treatment with an agent yielding metal can be carried out by a method in itself known in substance, on the fibre or in the dyebath. The treatment in substance with an agent yielding chromium may be carried out, for example, with a salt of trivalent chromium. It is necessary, however, to note that at temperatures of 100° C. and higher which are usually necessary for this reaction it is often disadvantageous to work in a mineral acid medium, as the acylamino group present in the dyestuff may be hydrolyzed under these conditions. In such cases it is advisable to use as an agent yielding chromium a chromium salt of a weak acid such as chromium formate or chromium acetate.

Especially valuable results are obtained when the dyestuffs are treated on the fibre or in the dyebath with an agent yielding metal, advantageously an agent yielding chromium. In this manner very valuable dyeings of good fastness to light are obtained on animal materials such as leather, silk and above all wool, and on artificial fibres of superpolyamides or superpolyurethanes. The treatment on the fibre may be carried out, for example, by the known after-chroming processes.

The following examples illustrate the invention the parts and percentages being by weight unless otherwise stated.

Example 1

21.1 parts of 6-nitro-4-acetylamino-2-amino-1-hydroxybenzene are stirred in 75 parts of water and 15 parts of hydrochloric acid of 30 per cent. strength, and diazotized at 10–15° C. with 25 parts by volume of a 4N-solution of sodium nitrite in the usual manner. After neutralization with sodium carbonate the diazotization mixture is introduced into a solution of 26.5 parts of 2:8-dihydroxynaphthalene-6-sulfonic acid and 22 parts of sodium carbonate in 150 parts of water at 5–10° C. and the coupling mixture is stirred until the formation of dyestuff ceases. The dyestuff, which may be completely precipitated by the addition of sodium chloride, is filtered off and washed with a small amount of sodium chloride solution of 5 per cent. strength and dried. The dry dyestuff is a dark powder which dissolves in cold water with a blue coloration and in cold concentrated sulfuric acid with a reddish blue coloration, and dyes wool by the after-chroming process blue-green tints having good properties of fastness.

By using 23.9 parts of 6-nitro-4-n-butyrylamino-2-amino-1-hydroxybenzene, instead of 21.1 parts of 6-nitro-4-acetylamino-2-amino-1-hydroxybenzene, there is obtained a dyestuff which likewise dissolves in cold water with a blue coloration and in cold concentrated sulfuric acid with reddish blue coloration, and dyes wool by the after-chroming process similar blue-green tints having good properties of fastness.

By using 27.3 parts of 6-nitro-4-benzoylamino-2-amino-1-hydroxybenzene, instead of 21.1 parts of 6-nitro-4-acetylamino-2-amino-1-hydroxybenzene, there is obtained a dyestuff which likewise dissolves in cold water with a blue coloration and in cold concentrated sulfuric acid with a reddish blue coloration, and dyes wool by the after-chroming process similar blue-green tints having good properties of fastness.

Example 2

100 parts of well wetted wool (for example, loose wool) are introduced at 60° C. into a dyebath which contains in 4000 parts of water, 1.5 parts of the dyestuff obtainable as described in Example 1, 4 parts of acetic acid of 40 per cent. strength and 10 parts of crystalline sodium sulfate. The temperature is raised to the boil in the course of 30 minutes, and dyeing is carried on at the boil for 45 minutes. 5 parts of sulfuric acid of 10 per cent. strength are then added, and dyeing is continued for a further 15 minutes. The dyebath is then cooled to about 70° C., 1 part of potassium bichromate is added, the bath is raised to the boil, and chroming is carried on at the boil for about 40 minutes. The wool is dyed a level blue-green tint, and the dyeing is of very good fastness to washing and light.

What is claimed is:

1. A monoazo-dyestuff of the formula

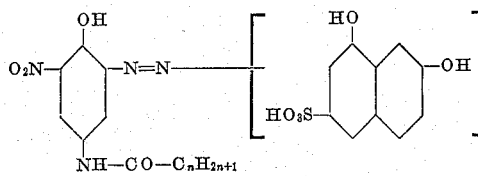

in which the azo group is linked to the naphthalene nucleus in ortho-position to a hydroxyl group and $n$ represents a whole number of at the most 3.

2. A monoazo-dyestuff of the formula

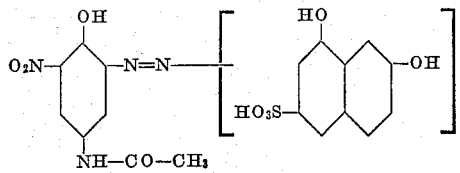

in which the azo group is linked to the naphthalene nucleus in ortho-position to a hydroxyl group.

3. A monoazo-dyestuff of the formula

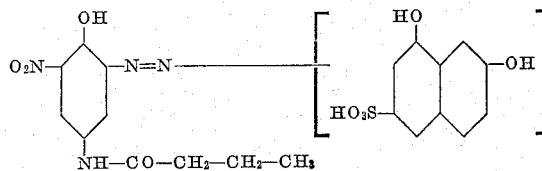

in which the azo group is linked to the naphthalene nucleus in ortho-position to a hydroxyl group.

References Cited in the file of this patent

UNITED STATES PATENTS

| | | |
|---|---|---|
| 2,418,416 | Locke | Apr. 1, 1947 |
| 2,620,332 | Widmer et al. | Dec. 2, 1952 |

FOREIGN PATENTS

| | | |
|---|---|---|
| 3,096 | Great Britain | of 1904 |